(12) United States Patent
Blanc et al.

(10) Patent No.: US 7,318,373 B2
(45) Date of Patent: *Jan. 15, 2008

(54) DEVICE FOR PRODUCTION OF A DRINK BY INFUSION

(75) Inventors: Jean-Pierre Blanc, Nice (FR); Christian Ferrier, Nice (FR)

(73) Assignee: Compagnie Mediterraneenne des Cafes S.A., Carros (FR)

( * ) Notice: Subject to any disclaimer, the term of this patent is extended or adjusted under 35 U.S.C. 154(b) by 487 days.

This patent is subject to a terminal disclaimer.

(21) Appl. No.: 10/506,217

(22) PCT Filed: Apr. 29, 2003

(86) PCT No.: PCT/FR03/50001

§ 371 (c)(1),
(2), (4) Date: Sep. 1, 2004

(87) PCT Pub. No.: WO03/101265

PCT Pub. Date: Dec. 11, 2003

(65) Prior Publication Data

US 2005/0106288 A1    May 19, 2005

(30) Foreign Application Priority Data

Jun. 3, 2002    (FR) .................... 02 06765

(51) Int. Cl.
*A47J 31/40*    (2006.01)

(52) U.S. Cl. ...................... 99/302 P; 99/295

(58) Field of Classification Search ............. 99/302 P, 99/295, 289 R, 302 R
See application file for complete search history.

(56) References Cited

U.S. PATENT DOCUMENTS

| | | | | | |
|---|---|---|---|---|---|
| 4,579,049 | A | * | 4/1986 | Rodrigues | ................. 99/289 R |
| 4,681,028 | A | * | 7/1987 | Schmed et al. | ........... 99/289 R |
| 5,454,293 | A | * | 10/1995 | Santi | ........................ 99/289 R |
| 5,755,149 | A | * | 5/1998 | Blanc et al. | .............. 99/289 T |
| 5,794,519 | A | * | 8/1998 | Fischer | ....................... 99/295 |

FOREIGN PATENT DOCUMENTS

| | | |
|---|---|---|
| EP | 1 219 217 | 7/2002 |
| WO | WO 00/44268 | 8/2000 |

* cited by examiner

*Primary Examiner*—Reginald L. Alexander
(74) *Attorney, Agent, or Firm*—Young & Thompson

(57) ABSTRACT

A device for the production of beverages such as coffee by infusion of a product contained in a tablet includes an infusion chamber adapted to receive such a tablet (2) and has two portions (3, 4) arranged to move toward or away from each other to close or open the infusion chamber. Only one of the portions has mobility in rotation adapted to place the tablet (2) in abutment in the portion, the portion (3) movable in rotation having mobility in translation to open or close the infusion chamber, and having common drive elements for the mobility in translation and the mobility in rotation of the movable portion (3). The drive elements having a rotatable drive shaft (13) coupled to the movable portion (3) by at least one rod (14a, 14b) mounted pivotably between the drive shaft (13) and the movable portion (3).

13 Claims, 8 Drawing Sheets

DEVICE FOR PRODUCTION OF A DRINK BY INFUSION

FIELD OF THE INVENTION

The present invention relates to a device for the production of beverages by infusion from a product contained in a tablet.

It finds particular use in the field of the production of coffee from ground coffee prepackaged in tablets.

BACKGROUND OF THE INVENTION

Such tablets already exist and are generally constituted by an assembly of two sheets of filter paper providing an intermediate space for packaging the ground coffee.

Various machines for extracting hot beverages from coffee grounds are known.

Particularly, WO-A-00/38558 discloses an extraction chamber for an automatic machine for the preparation of hot beverages, in which the extraction chamber is provided to receive tablets or pellets preloaded with ground coffee.

The chamber is constituted of two parts, each movable in a horizontal plane so as to be able to move toward or away from each other.

Moreover, according to this document, the two portions are also movable in an oscillating manner.

A machine thus constituted gives general satisfaction but requires the drive of the two constituent parts of the chamber.

It is thus necessary to provide sufficiently powerful motorization and a system of power transmission that is relatively complicated, requiring the synchronization of the movements.

There is moreover known, from FR-A-2.745.995 an apparatus for the production of beverages in which the infusion chamber is constituted by two half recesses, one carried by one surface of the body of the apparatus, the other fixed to a surface of the heater, these two surfaces facing each other.

The infusion chamber is formed when the two half recesses are joined.

Disassembly of the chamber takes place by a translatory movement of one of the recesses.

The apparatus thus provided requires the association of different abutment means ensuring the retention of the tablet at the time of supply, then during its entry into the infusion chamber.

A mobility of the abutment means is equally necessary to ensure the ejection of the used tablets.

The prior art disclosed by this reference requires the provision of separate abutment and ejection means for the tablets.

The present invention permits overcoming these drawbacks.

It provides for this purpose an improved device for the production of beverages.

SUMMARY OF THE INVENTION

A first advantage of the invention is to permit carrying out the opening and closing phases of the infusion chamber as well as the performance of the phases of introduction and injection of the tablets, by means of a lesser number of movements and in particular by the combined movement of rotation and translation of only one of the constituent parts of the chamber.

It has overcome the prejudice according to which the placing into abutment of the tablet and the opening and closing of the chamber require mobility of a plurality of pieces: two half chambers or additional abutments.

Another advantage of the invention is requiring in a preferred embodiment only a single drive means for the movement of rotation to a movement of translation, thereby ensuring with certainty and least cost the synchronization.

According to a preferred modification, the invention is such that it can be used and actuated by a user by the force of a lever.

Other objects and advantages will become apparent from the description which follows of a preferred embodiment of the invention which is however not limiting.

The present invention relates to a device for the production of beverages by infusion of a product contained in a tablet, comprising an infusion chamber adapted to receive a tablet and comprising two portions arranged to be brought together or spaced apart to close or open the infusion chamber, characterized by the fact that one of the portions has a movement in rotation adapted to place the tablet in abutment in said portion, the portion movable in rotation has a movement in translation to open or close the infusion chamber, and in that it comprises common drive means for movement in translation and movement in rotation of the movable portion, said drive means comprising a rotatable drive shaft coupled to the movable portion by at least one rod mounted pivotally between said drive shaft and said movable portion.

According to preferred modifications, the device is such that:

- it comprises a translatory member secured to the movable portion in its translation movement and relative to which it is movable in rotation.
- it has guide means in translation for the translatory member.
- the shaft is actuated in rotation by a lever.
- it comprises means for holding closed the two portions of the infusion chamber.
- it comprises guide means for the tablet.
- the guide means comprise a slide way with at least one groove adapted to receive the periphery of a tablet.
- the guide means are mounted in translation to follow the movement toward or away from each other of the portions.
- it comprises a heater located on the side of the portion fixed in rotation.

BRIEF DESCRIPTION OF THE DRAWINGS

The accompanying drawings are given by way of example and are not limiting of the invention. They show only an embodiment of the invention and will permit easy comprehension of it.

DETAILED DESCRIPTION OF THE INVENTION

Figure 1:
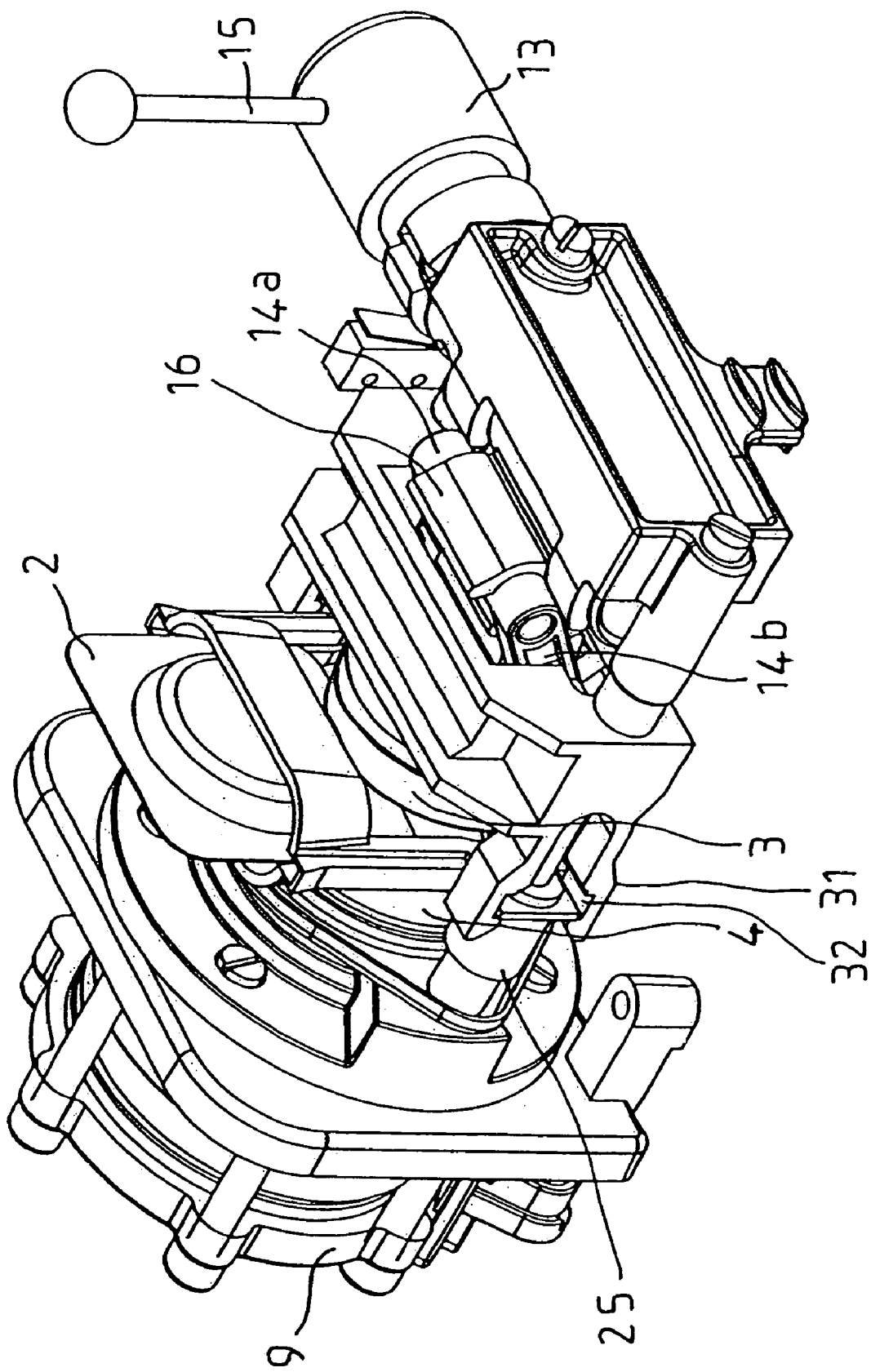
FIG. 1 is a general perspective view of the device of the invention.
Figure 2:
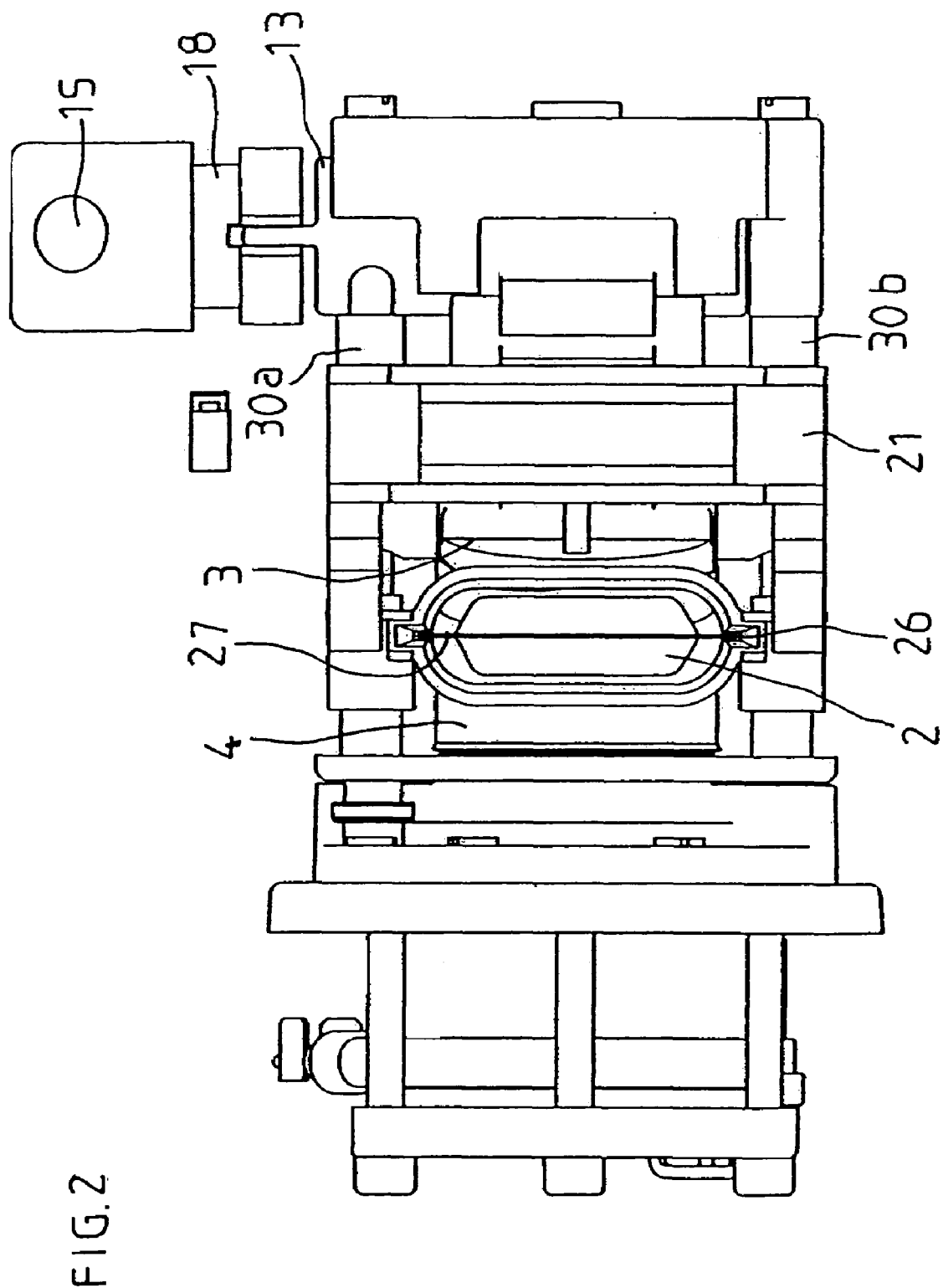
FIG. 2 is a top plan view.

Referring to the drawings, and particularly to FIGS. 1 and 2, the device according to the invention has in a conventional manner a heater 9 adapted to supply the infusion chamber 1 with hot water for the extraction of the material contained in the tablet and particularly of the ground coffee.

Figure 4:
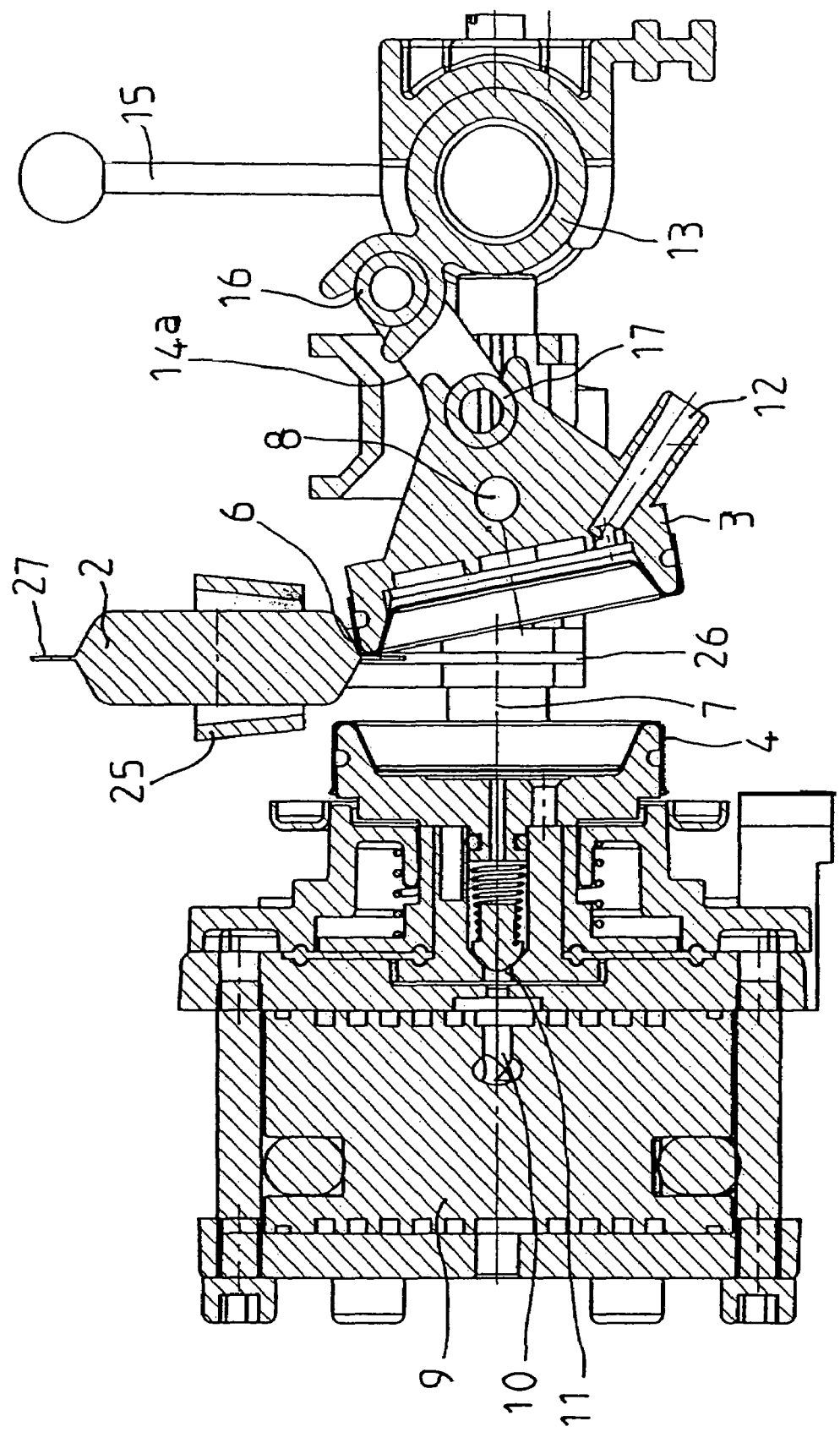

As shown in FIG. 4, a water circuit 10 is present through the device with a portion 11 for admission of hot water into the infusion chamber 1 and an outlet portion 12 opening into a trough pouring the beverage into a funnel to the receptacle of the user.

The tablets used for the operation of the present invention could be of known type available on the market.

Preferably, but in a non-limiting manner, there could be used tablets 2 comprising a substantially flat and rigid periphery ensuring maintaining the shape of the tablet.

Figure 5:
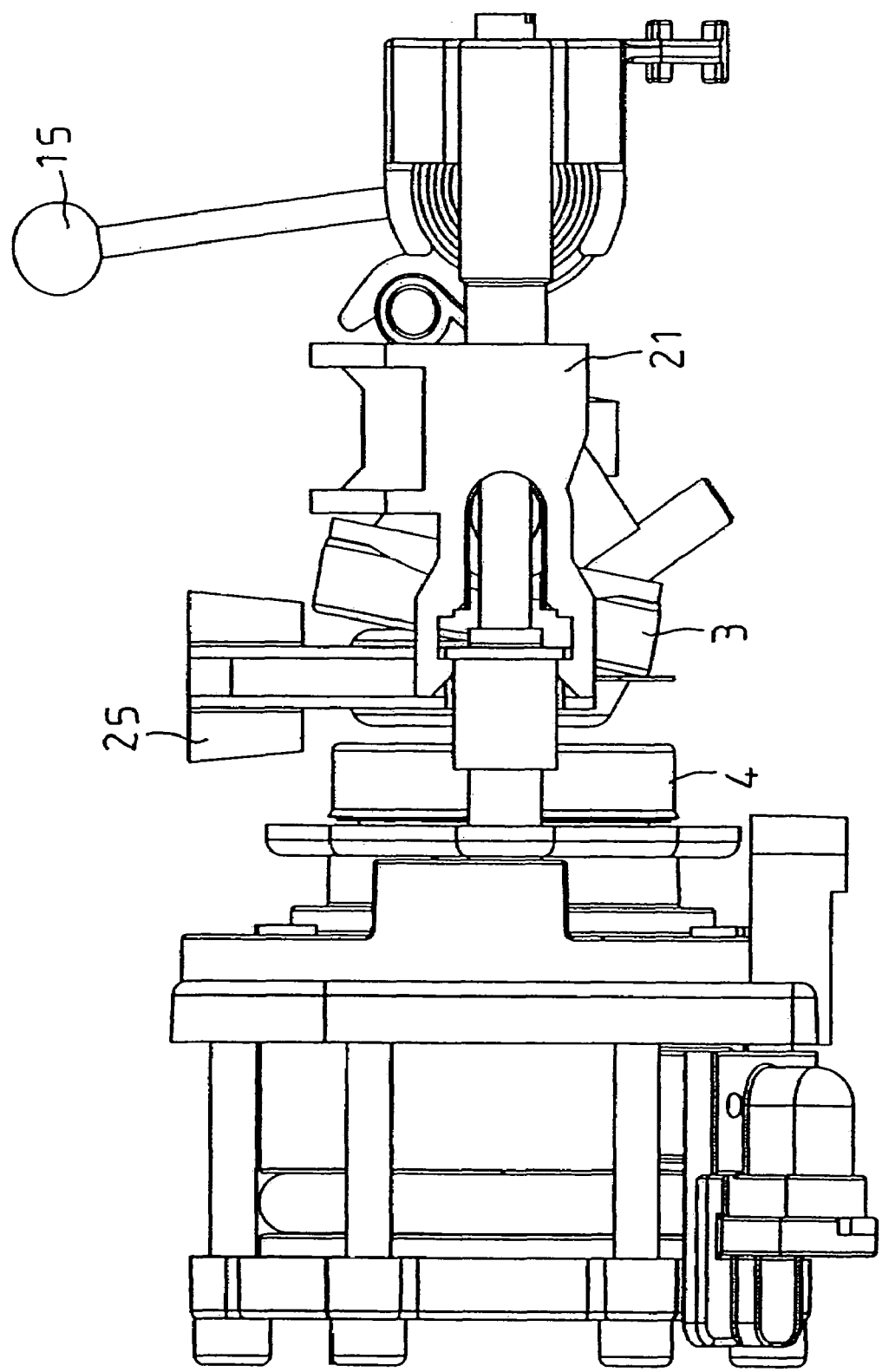
FIGS. 5 and 6 are respectively side and cross-sectional views of the device of the invention in a position for receiving tablets in the infusion chamber.
Figure 6:
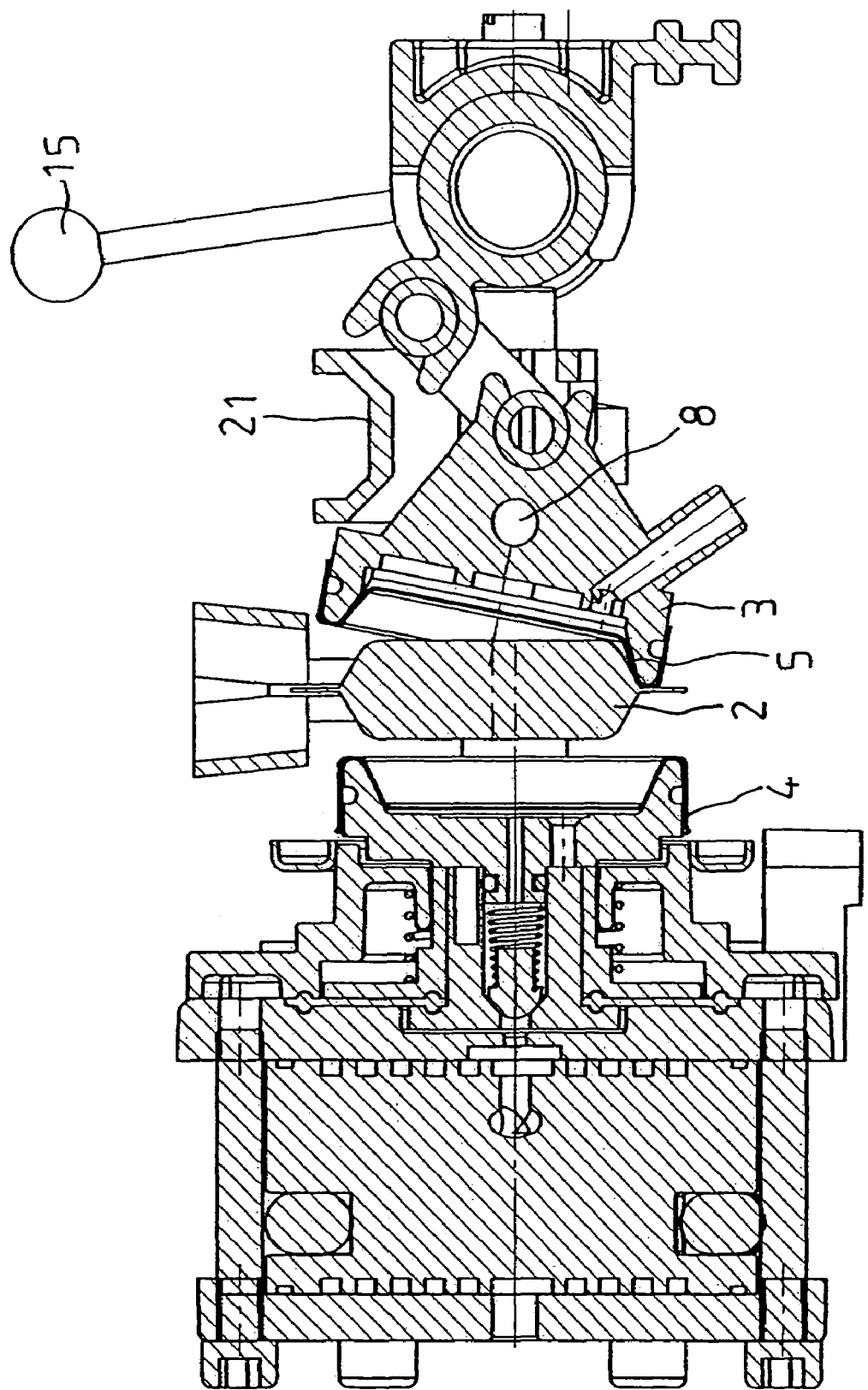
Figure 7:
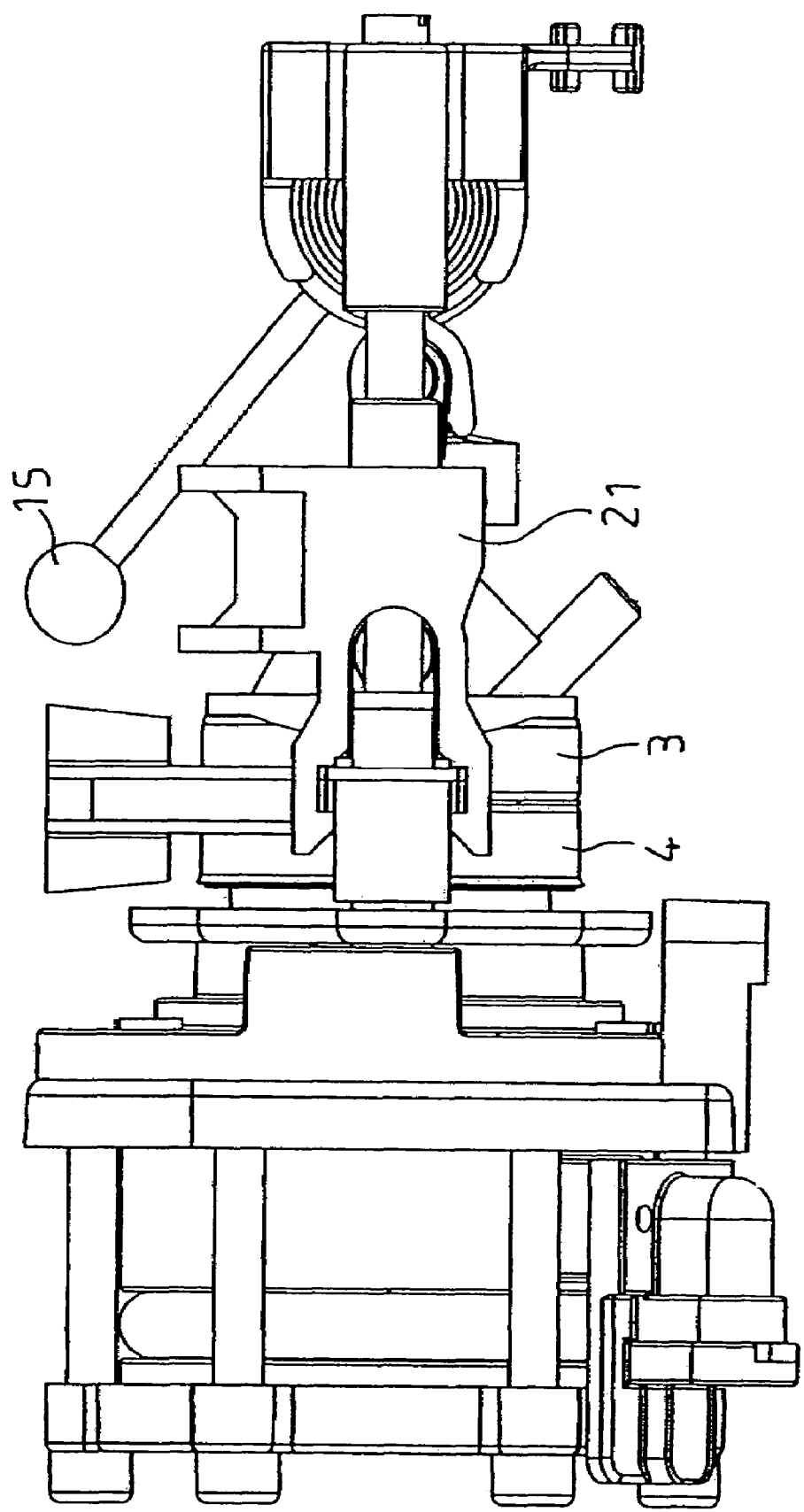
FIGS. 7 and 8 are respectively side and longitudinal cross-sectional views of the device of the invention in the extraction position.
Figure 8:
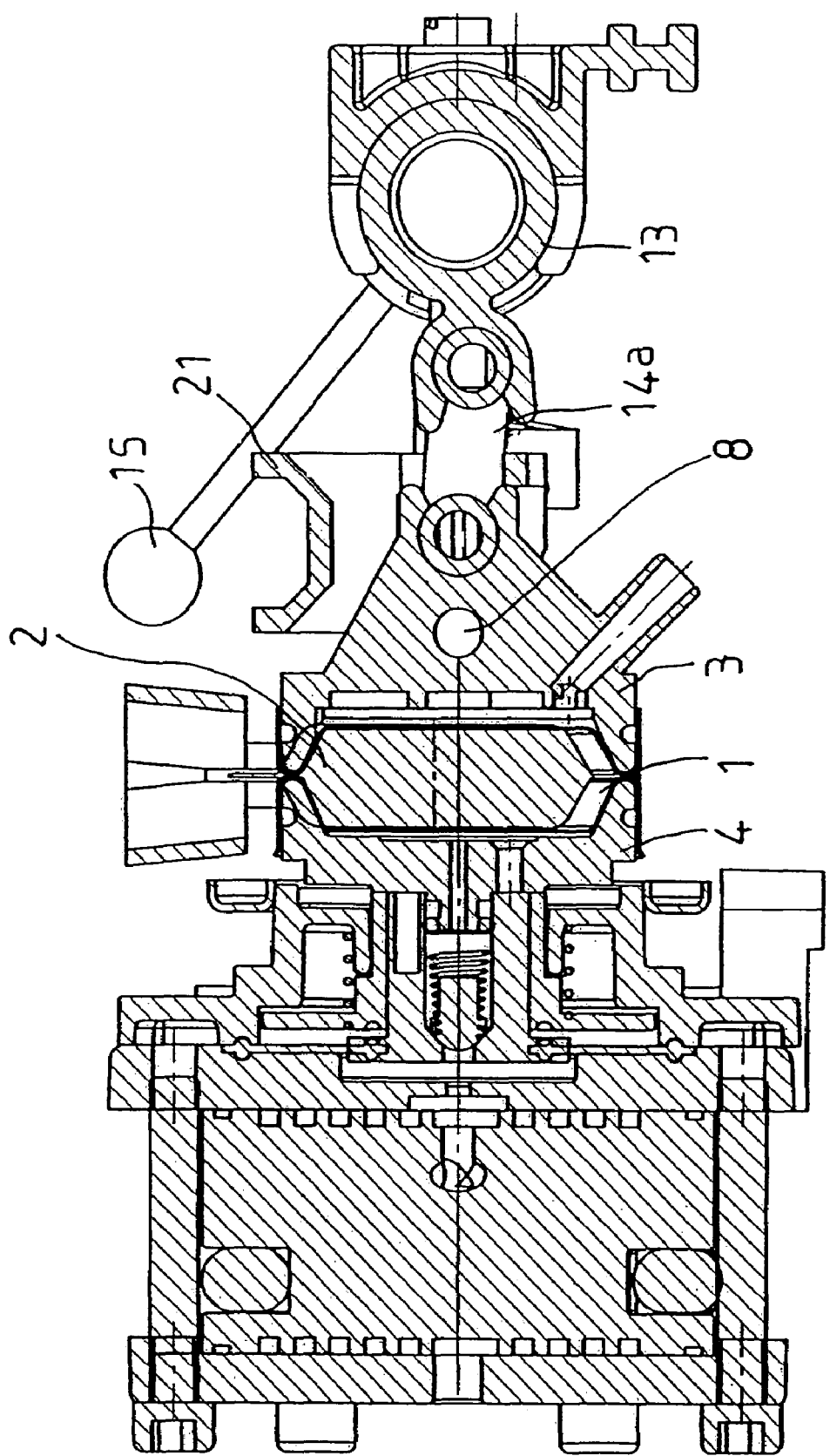

The infusion chamber 1 is constituted by two portions 3, 4 adapted to be brought together to close the chamber 1 as shown in FIGS. 7 and 8 or to be spaced apart to open it as shown in FIGS. 3 to 6.

Preferably, and in the description that follows, it is the portion 3 which will move in translation to move toward or away from the other portion 4.

Moreover, the portion 3 is given a movement of rotation over a limited path to pass between various positions during operation.

Preferably, there is used a same drive means to ensure the translation and the rotation of the movable portion 3.

There is shown by way of example in FIG. 4, the position of the axis 8 of rotation of the movable portion 3 and the axis 7 of its translation.

In what follows of the description and with reference to the drawings, the example of the extraction machine is in a horizontal position (in which the tablet is positioned substantially vertically and receives hot water along a substantially horizontal circuit).

However, other orientations are possible without departing from the scope of the invention.

The single drive means is constituted by a drive shaft 13 with a horizontal axis of rotation and adapted to cause movements of the movable portion 3.

To do this, the shaft 13 co-acts with at least one rod 14a, 14b but preferably two rods.

As is shown for example in FIG. 4, the rod 14a, 14b is mounted on a connection pivot 16, 17 on the one hand on the shaft 13 and on the other hand on the rear end of the movable portion 3.

A translatory member 21 is also provided to follow securely the movement of translation of the movable portion 3 and to ensure the pivotal articulation about the axis 8 of said movable portion 3.

The translation of the member 21 is moreover guided by guide means which could be constituted by two lateral guides 30a, 30b as shown in FIG. 2.

According to a first possibility, the shaft 13 is driven in rotation by a motor.

According to a second possibility, shown in the figures, the driving in rotation is carried out by means of a lever 15 that can be actuated by the user.

In this case, the movable portion 3 is inclined downwardly to provide an abutment surface 6 in its other portion to co-act with the external roller surface of the tablet 2.

The surface 6 thus constitutes an abutment in the supply phase of the tablet 2.

To improve the sealing of the infusion chamber 1 in the closed position, it is preferable to add to the closure pressure provided by the user by means of the lever 16, an additional pressure.

In this case, a closure gripping means for the two portions 3, 4 of the infusion chamber 1 can be constituted as a supplement.

By way of preferred example, there will be used closure means in the form of a hydraulic jack with a membrane whose movable membrane is adapted to give rise to a slight movement of portion 4 of the infusion chamber.

Any other gripping means is also envisageable.

Preferably, the device able comprises guide means for the tablet 2 during its movement during operating phases.

In this case, there could be provided guide means in the form of a slide way 25 constituted by two grooves 26 adapted to encase the periphery of the tablet 2.

The periphery of said tablet 2 can be inserted in each of the grooves 26 thus provided.

The guide means are preferably mounted for translation to follow the movement toward and away from each other of the two portions.

Figure 3:
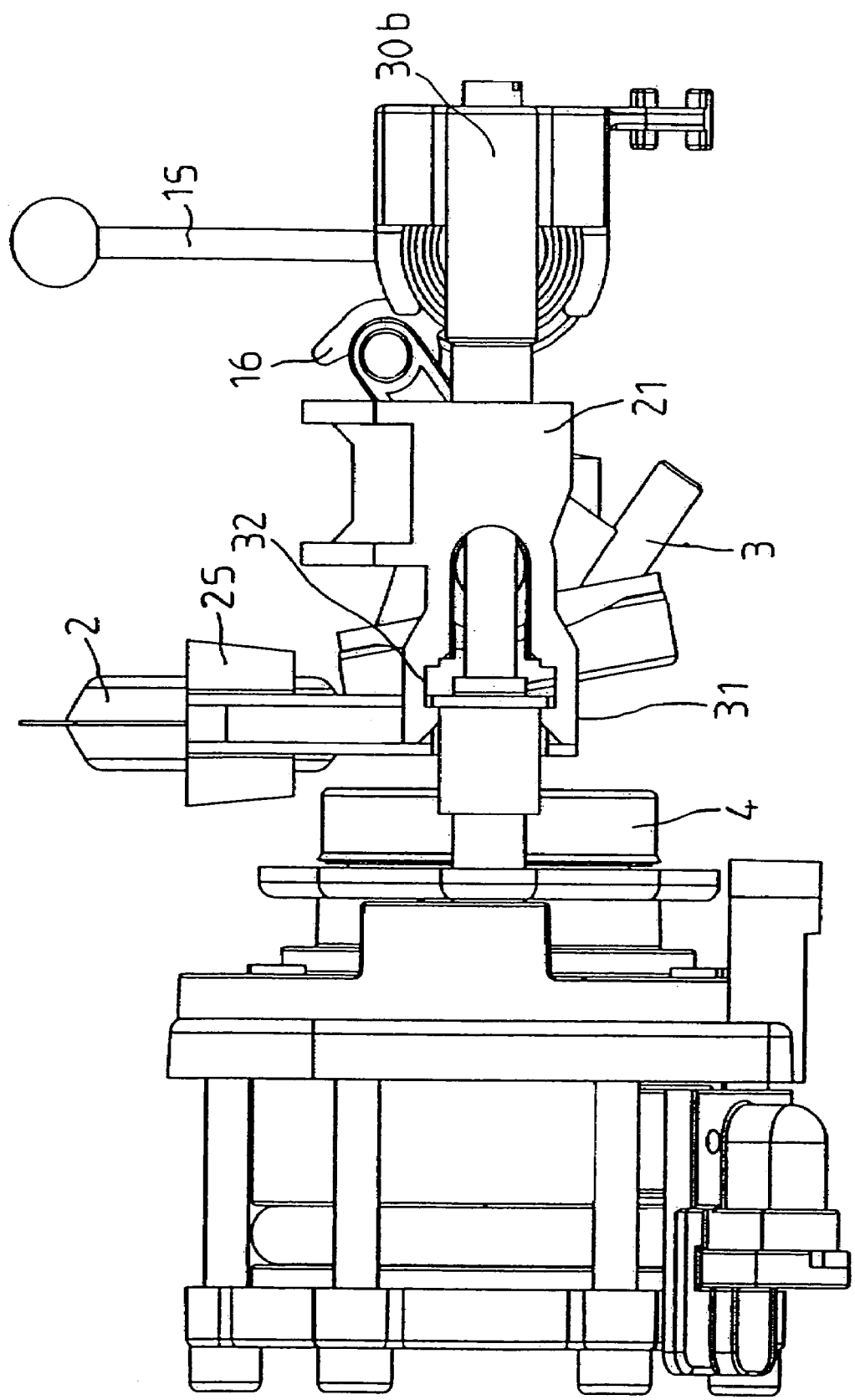
FIGS. 3 and 4 are respectively side and longitudinal cross-sectional views of the device of the invention in the position for supplying tablets.

In this case, these means have a movement coupled with that of the translatory member 21 by means of pushers 31 shown particularly in FIG. 3.

The pusher 31 comprises a portion with a gap 32 adapted to constitute two bearing portions of the pusher 31 on one corresponding surface of the guide means.

In this way, the movement of the guide means follows that of the translatory member 21 in the course of the operating phases.

Moreover, the vacuum drawn between the two bearing surfaces formed by the gap 32 ensures a retardation of the movement of the guide means adapted to ensure first of all an advance of the movable portion 3 alone, then a joint advance of the guide means and the movable portion 3 toward the fixed portion 4.

The pusher system thus constituted can be provided in a guided fashion about two lateral guides 30a, 30b ensuring the guidance and translation of the movable elements and the coherence of the constituent pieces of the device.

The phases of operation of the present device will be more particularly shown in FIGS. 3 to 8.

FIGS. 3 and 4 show a first position of operation of the device in which the tablet 2 is in abutment position on the upper wall of the movable portion 3.

The lever 15 is itself in a predetermined angular position, vertical in this case.

An actuation of the lever 15 in the trigonometrics direction permits arriving at the position shown in FIGS. 5 and 6 in which the tablet 2 is received in the movable portion 3.

Between these two phases of movement, the drive shaft 13 has caused the bearing of the rod 14a against the rear portion of the movable portion 3 and has particularly caused a rotation of the movable portion in the clockwise direction.

Continuing the rotation of the lever 15, the shaft 13 gives rise to a supplemental pressure on the movable portion 3 by means of rods 14a, 14b, this supplemental pressure tending to translate the movable portion 3 and to cause its closing to constitute the extraction chamber 1.

There can be provided abutment services particularly on the translatory member 21 to limit the angular mobility of the movable portion 3.

Thus, in the position shown in FIGS. 7 and 8, the movable portion 3 closes the extraction chamber 1.

When the infusion chamber is closed, hot water is injected into the infusion chamber.

The beverage is recovered in the trough.

When brewing is completed, a reverse movement of the shaft 13 causes the retraction of the movable portion 3 and its pivoting in the trigonometric direction.

The movable portion being out of the way, the tablet 2 can be freed and fall by gravity toward a recovery zone.

The movable portion 3 thus having pivoted downwardly, ensures the formation again of the supply abutment surface 6 on the upper portion of the movable portion 3.

FIGS. 3, 5 and 7 show in side view the performance of translatory movement of the guide means when the latter is present.

In this case, there is seen the pusher 31 adapted to cause the advance of the guide means 25 with the advance of the movable portion 3.

The gap 32 present on the pusher 31 however ensures retardation of the translation of the guide means 25.

The end of discharge of the tablet 2 takes place when the movable portion 3 has retreated and while the guide means 25 are still in position.

Once the tablet is evacuated, the guide means 25 undergo in turn a translation.

The retardation to the translation of the guide means 25 ensures the good dislodging of the tablet 2 before the complete return to initial position of the device.

REFERENCES

1. Infusion chamber
2. Tablet
3. Movable portion
4. Fixed portion
5. Reception abutment
6. Supply abutment
7. Axis of translation
8. Axis of rotation
9. Heater
10. Water circuit
11. Inlet
12. Outlet
13. Drive shaft
14*a*, 14*b*. Rod
15. Lever
16. Pivotal connection on the shaft
17. Pivotal connection on movable portion
18. Coupling member
21. Translatory member
25. Slide
26. Groove
27. Tablet periphery
30*a*, 30*b*. Lateral guides
31. Pusher
32. Gap

The invention claimed is:

1. Device for the production of beverages by infusion, from a product contained in a tablet (2), comprising an infusion chamber (1) adapted to receive a tablet (2) and comprising two portions (3, 4) adapted to move toward or away from each other to close or open the infusion chamber (1), characterized by the fact that one (3) of the portions has a movement in rotation adapted to place the tablet (2) in abutment in said portion, that the portion (3) movable in rotation has mobility in translation to open or close the infusion chamber (1), and that it comprises a common drive means for the mobility in rotation and the mobility in translation of the movable portion (3), said drive means comprising a rotatable drive shaft (13) coupled to the movable portion (3) by at least one rod (14a, 14b) pivotally mounted between said drive shaft (13) and said movable portion (3).

2. Device according to claim 1, which further comprises a translatory member (21) secured to the movable portion (3) in its translation movement and relative to which the movable portion (3) is movable in rotation.

3. Device according to claim 2, which further comprises means (30a, 30b) for guiding in translation the translatory member (21).

4. Device according to claim 1, wherein the shaft (13) is actuated in rotation by a lever (15).

5. Device according to any claim 1, which further comprises means for holding closed the two portions of the infusion chamber (1).

6. Device according to claim 1, which further comprises guide means for the tablet (2).

7. Device according to claim 6, wherein the guide means comprise a slide (25) with at least one groove (26) adapted to receive the periphery (27) of a tablet.

8. Device according to claim 6, wherein the guide means are mounted for translation to follow the movement of the portions toward or away from each other.

9. Device according to claim 1, which further comprises a heater (9) located on a side of the portion (4) fixed in rotation.

10. Device according to claim 7, wherein the guide means are mounted for translation to follow the movement of the portions toward or away from each other.

11. Device according to claim 1, wherein said movable portion (3) is movable in rotation about an axis (8) that moves in translation with rectilinear movement toward or away from the other of said portions (4).

12. Device according to claim 11, wherein said rectilinear movement takes place along an axis (7) that passes through an axis (8) about which said movable portion (3) rotates and through an axis about which said rotatable drive shaft (13) rotates.

13. Device according to claim 12, wherein said axis of rectilinear movement (7) of said movable portion (3) passes through a center of said other portion (4).

* * * * *